United States Patent [19]
Fitch et al.

[11] B 3,914,743
[45] Oct. 21, 1975

[54] DATA SYSTEM MULTIBRANCH JUNCTION CIRCUIT HAVING BRANCH LINE SELECTION

[75] Inventors: Scott McDowell Fitch, Holmdel; Leo Michael Kolensky, Irvington; Joseph Conrad Panek, Jackson Twp., Ocean County; David Charles Rife, Lincroft; Walter Rudolph Schaefer, Wall Twp., Monmouth County, all of N.J.

[73] Assignee: Bell Telephone Laboratories, Incorporated, Murray Hill, N.J.

[22] Filed: Nov. 24, 1972

[21] Appl. No.: 309,207

[44] Published under the Trial Voluntary Protest Program on January 28, 1975 as document no. B 309,207.

[52] U.S. Cl. ........................ 340/147 R; 340/147 LP
[51] Int. Cl. ........................ H04Q 5/00
[58] Field of Search .................. 340/147 LP, 147 R; 179/15 AQ, 15 AT, 15 BD; 178/2, 4.1, 73

[56] References Cited

UNITED STATES PATENTS

| | | | |
|---|---|---|---|
| 3,288,919 | 11/1966 | Abbott | 340/147 LP |
| 3,526,757 | 9/1970 | Rees et al. | 340/147 LP |
| 3,639,904 | 2/1972 | Arulpragasam | 340/147 LP |
| 3,665,398 | 5/1972 | Kawai et al. | 340/147 LP |

*Primary Examiner*—Harold I. Pitts
*Attorney, Agent, or Firm*—Roy C. Lipton

[57] ABSTRACT

A multipoint hub or junction unit has a main channel connected to a control station of a selective calling line and a plurality of branch lines, certain of the branch lines connected to downstream line stations and one branch line connected to a main channel of a downstream multipoint junction unit whose branches are connected to other line stations. Normally, downstream data signals from the control station are split by the hub and broadcast to all the branches, the signals to the downstream hub being split again. Upstream transmission on each branch is combined and propagates to the main line. The multipoint junction unit normally blocks upstream supervisory signals. When branch lines are to be tested, signaling equipment is connected into the main line and signals the hub to block all its branches, to select blocked branches to be tested and to unblock the selected branches to permit passage of upstream and downstream data and supervisory signals.

8 Claims, 5 Drawing Figures

DATA SYSTEM MULTIBRANCH JUNCTION CIRCUIT HAVING BRANCH LINE SELECTION

FIELD OF THE INVENTION

This invention relates to data communication networks and, more particularly, to network hubs or junctions for broadcasting data from control locations to downstream branch lines and for repeating data from stations terminating the branch lines to the upstream control location.

DESCRIPTION OF THE PRIOR ART

A private line data network shared by a plurality of line stations whose operations are controlled from a remote control station is known as a multipoint selective calling line. The control station is equipped with a master controller, such as a computer, which can communicate with any of the stations, allowing the line stations to transmit to the computer station, one at a time, storing and possibly processing the message thus received from the sending line station and then possibly retransmitting the message to other stations on the line or on other lines that may be connected to the computer.

The computer station is connected via a main channel to a common carrier office, called a hub or junction office, in which the main channel is split into branches in the downstream direction toward the line stations and the branches are combined in the upstream direction from the line stations to the computer stations. Signals from the computer station to the hub office are broadcast to all the branch lines for transmission to line stations, to local offices or to other hub offices further downstream. In the latter case, the signal is split again to be broadcast to branches on the downstream hub. In the opposite direction, the transmission from each line station passes upstream on the branch to the hub office where the branches are combined and the signal will thus eventually propagate up to the main line extending to the computer station.

It is conventional for the common carrier to provide appropriate administrative or housekeeping functions for the network, which functions include the detecting of trouble or out-of-service line conditions and the testing of equipment in the network. Centrally located test equipment is generally placed in the hub office. Supervisory signals for signaling line or equipment conditions are reserved by the common carrier and each branch line is capable of sending appropriate supervisory signals to the hub. When trouble appears on one of the branch lines, an appropriate signal is propagated upstream. An attendant at the hub, upon ascertaining that a line is in trouble, operates the test equipment to send test signals back downstream to the line, testing the equipment thereon and to display the responses from the tested equipment.

In order to reach all the branch lines, it is desirable to locate the testing equipment on the main line of the hub. In this event, the hub must necessarily pass supervisory code signals, in both directions, when branch lines are being tested. If, during the normal operating mode, supervisory codes are permitted to propagate up through the hub to the computer station, the entire multipoint network would be rendered inoperative. Moreover, the hub normally splits downstream signals and broadcasts them to all the branches, which function is undesirable during the test mode.

It is an object of this invention to provide an improved multipoint network which is arranged to accommodate housekeeping functions. It is a more specific object of this invention to provide housekeeping functions including the upstream propagation of supervisory codes without rendering the entire network inoperative. It is a further object of this invention to permit signaling equipment to communicate with selected branches and to exclude the unselected branches.

SUMMARY OF THE INVENTION

In accordance with this invention, the hub normally blocks supervisory codes from passing upstream from the branch lines to the main line, selects branch lines in response to predetermined signals from the testing equipment on the main line and thereafter permits supervisory codes to pass upstream from selected branch lines to the main line. More specifically, the hub normally splits downstream data signals and broadcasts them to the branch lines and normally combines upstream data signals and repeats them to the main line and blocks upstream supervisory code signals; blocks all upstream and downstream data and supervisory signals in response to an initial one of the predetermined signals; and in response to subsequent ones of the predetermined signals, selects branch lines and permits passage therethrough of data and supervisory signals to and from each selected branch line.

It is an additional feature of this invention that the hub returns identifying data signals back up the main line, identifying the hub when the initial predetermined signal is received and identifying each branch line when the line is selected.

In the illustrative embodiment of the invention described hereinafter, there is disclosed a multipoint signaling network including a control station; a plurality of line stations; a first hub unit having a main line connected to the control station and having a plurality of branch lines, certain of the branch lines being connected to individual ones of the line stations; and a downstream hub unit having a main line connected to a branch line of the first hub unit and having branch lines connected to other ones of the stations. Each hub unit normally broadcasts downstream data signals on its main line to all its branches and repeats upstream data signals on any one of its branches to the main line. When a first hub branch line is to be tested, signaling equipment is connected to the main line and the hub unit, in response to predetermined downstream signals, first blocks all its branches, then selects the blocked branch to be tested and finally permits the passage of downstream data signals to and upstream data signals from the selected branch line. A branch on the downstream hub can be selected by first selecting the branch connected to the downstream hub and then repeating the selection process with the downstream hub.

The foregoing and other objects and features of this invention will be more fully understood from the following description of an illustrative embodiment thereof taken in conjunction with the accompanying drawings.

DETAILED DESCRIPTION

Figure 1:
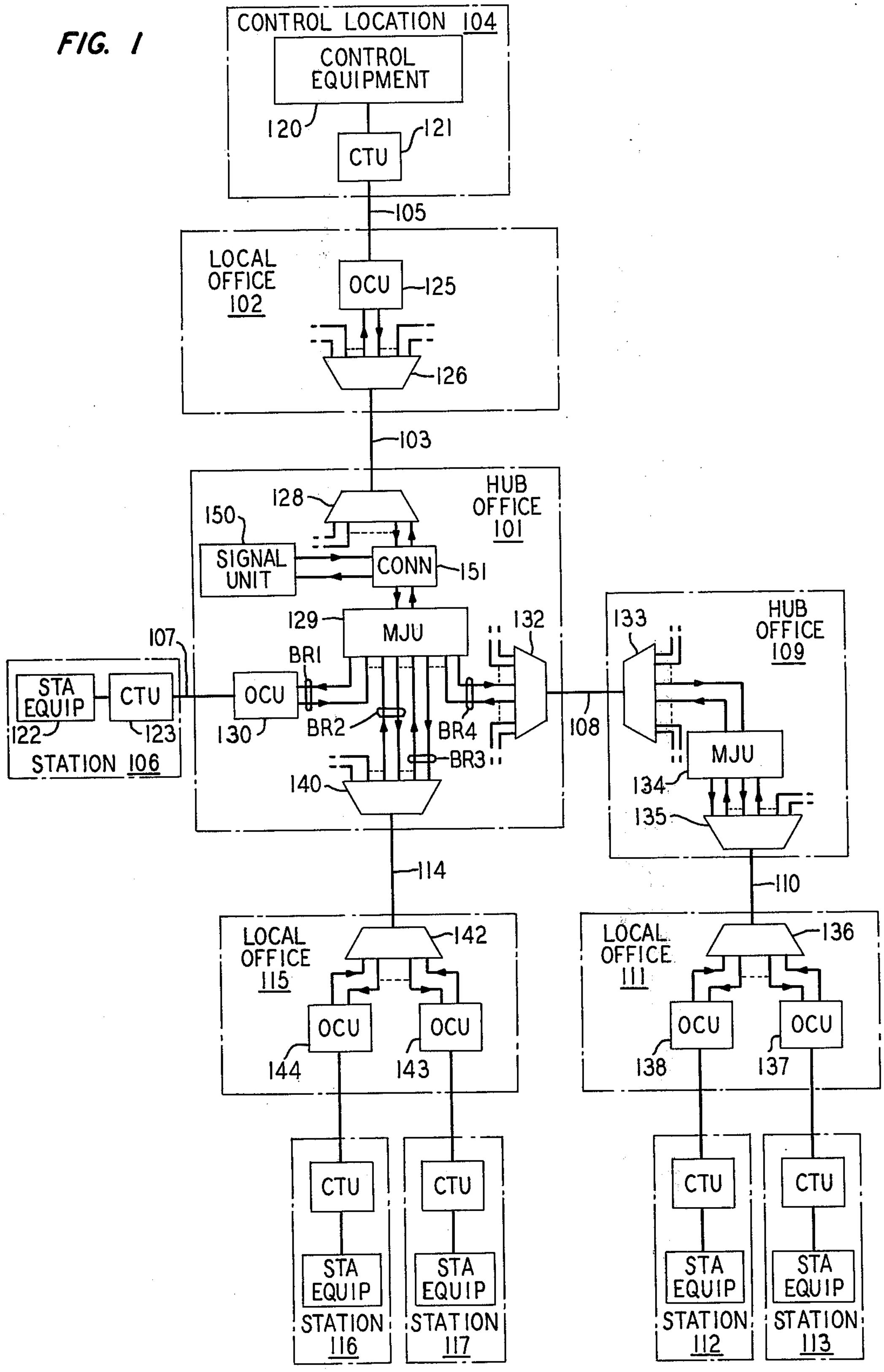
FIG. 1 discloses, in block form, various circuits and equipment which form a multipoint network in accordance with this invention.

The selective calling system as shown in FIG. 1 comprises control location 104, stations 106, 112, 113, 116 and 117 and an interconnecting network that interconnects control location 104 with the various stations. This interconnecting network includes hub offices 101 and 109 and local offices 102, 111 and 115. Control location 104 is connected to local office 102 over two-way line loop 105, which line loop is arranged to accommodate line signaling in both directions. Similarly, each of the stations is connected to a network hub or local office by way of a line loop which accommodates similar duplex line signaling. The offices are interconnected by way of two-way transmission trunks, local office 102 being connected to hub office 101 by way of two-way transmission trunk 103. Hub office 101 is, in turn, interconnected to hub office 109 and local office 115 by way of two-way trunks 108 and 114, respectively. Similarly, hub office 109 is interconnected with local office 111 by way of two-way trunk 110.

In general, it is the function of the network to convey data originating from control location 104 to all of the stations simultaneously and, in the reverse direction, to convey data originating from any one of the stations to control location 104. In the specific arrangement of the network shown herein, a station cannot communicate with another station and two stations cannot transmit to the control location at the same time.

Control location 104 generally consists of control equipment, indicated by block 120, and channel terminal unit 121. Control equipment 120 includes a data message transmitter (not shown) for sending data word messages to selected ones of the stations, a data message recorder (not shown) for receiving data word messages from selected ones of the stations, and control circuit equipment (not shown) for generating and sending address words to start station transmitters and turn ON station recorders. The outgoing data and address words are passed to channel terminal unit 121, which converts the data words to line signals suitable for application to two-way loop 105. Channel terminal unit 121 also converts the incoming line signals on two-way loop 105 to data and address words for application to control equipment 120.

Each station consists of station equipment and a channel terminal unit, such as station equipment generally indicated by block 122 and channel terminal unit 123 in station 106. A station transmitter for sending data word messages to the control location and a station recorder for receiving data word messages from the control location are included in the station equipment of each station. In addition, the station equipment includes circuit equipment for recognizing address words from the control location to start the station transmitter or turn ON the station recorder. The channel terminal unit in the station is arranged in substantially the same manner as channel terminal unit 121, converting locally generated data words to appropriate line signals for application to the station loop, such as loop 107, and for converting incoming line signals to corresponding data and address words.

Suitable control equipment for control location 104 and station equipment for each station, such as station 106, is disclosed in U.S. Pat. No. 3,427,588, issued to P. T. Mauzey, C. J. Votaw and H. M. Zydney on Feb. 11, 1969.

The general functions of the local and hub offices in the network are to multiplex data on various incoming channels for application to outgoing trunks and to demultiplex data on incoming trunks for application to outgoing channels or for multiplexing and application to outgoing trunks. Additional functions of the hub offices in the network are to split the "downstream" data information from control location 104 into various branches, the branches, in turn, extending to the several stations, and to combine the "upstream" data information from the several stations into the single branch leading to control location 104.

The first local office downstream from control location 104 is local office 102. Local office 102 includes office channel unit 125 and multiplexer/demultiplexer 126. Office channel unit 125 receives the data transmission from control location 104 and assembles the data into multibit bytes, writing a "1" bit into the eighth bit position of the byte to denote that the byte comprises a data (or address) word. The data byte is then fed into one port of multiplexer/demultiplexer 126 to be inserted into one time slot on trunk 103, while data bytes from other office channel units (not shown) in local office 102 are applied to other input ports of multiplexer/demultiplexer 126 for insertion into other time slots on trunk 103. The multiplexed bytes are then transmitted downstream via the trunk to hub office 101.

The upstream data bytes from hub office 101 on trunk 103 are passed to multiplexer/demultiplexer 126, which distributes the data bytes in each time slot to individual output ports, such as the port connected to the path extending to office channel unit 125. Office channel unit 125, in turn, strips off the eighth bit of the byte, disassembles the byte and applies the corresponding line signals to loop 105 for transmission upstream to location 104.

Although the specific circuitry for multiplexer/demultiplexer 126 and office channel unit 125 for providing the above-described functions may comprise many different well known arrangements, it is preferred that the circuitry be of the type disclosed in the copending application of M. P. Cichetti, Jr. and J. G. Kneuer, Ser. No. 256,827, filed May 25, 1972.

The downstream data on trunk 103 is passed to multiplexer/demultiplexer 128 in hub office 101. Multiplexer/demultiplexer 128, which is arranged in substantially the same manner as multiplexer/demultiplexer 126, distributes the data to its various output ports, applying to each port the data byte in the time slot corresponding to the port. The data bytes from office channel unit 125 are therefore provided to one port of multiplexer/demultiplexer 128, which port is connected to connector 151 and connector 151, in turn, is normally arranged to pass the data bytes to multipoint junction unit 129.

With respect to downstream data, and as described in detail hereinafter, it is normally the function of multipoint junction unit 129 to accept the data bytes coming downstream and to simultaneously apply the data bytes to downstream paths of various branches; multipoint junction unit 129 having four branches designated branches BR1, BR2, BR3 and BR4. The data bytes on the downstream paths of the four branches are simultaneously applied to office channel unit 130, an input port of multiplexer/demultiplexer 132 and two input ports of multiplexer/demultiplexer 140. The downstream data bytes on branch BR1 are converted to appropriate line signals by office channel unit 130 and passed by way of loop 107 to station 106. Data bytes on the downstream paths of branches BR2 and BR3 are multiplexed by multiplexer/demultiplexer 140, data bytes on branch BR2 being applied to one time slot and data bytes on branch BR3 being applied to another time slot on two-way trunk 114 for passage downstream to local office 115. Data bytes on the downstream path of branch BR4 are inserted in a time slot of two-way trunk 108 by multiplexer/demultiplexer 132 for passage downstream to hub office 109.

Each of the branches of multipoint junction unit 129 also includes an upstream path. Line signals from station 106 are converted to data bytes by office channel unit 130 and passed to the upstream path of branch BR1. Data bytes coming upstream in two of the time slots on trunk 114 are distributed to two output ports of multiplexer/demultiplexer 140 connected to the upstream paths of branches BR2 and BR3. Data bytes coming upstream in one of the time slots on trunk 108 are applied to an output port of multiplexer/demultiplexer 132 connected to the upstream path of branch BR4. The data on these upstream paths of the several branches are combined by multipoint junction unit 129 and applied to connector 151. Connector 151 is normally arranged to apply these data bytes to an input port of multiplexer/demultiplexer 128. These data bytes, in turn, are inserted in a time slot on trunk 103, transmitted upstream to multiplexer/demultiplexer 126 and then applied to the output port connected to office channel unit 125.

It is contemplated that only one station sends upstream at a time. If two stations simultaneously transmit upstream, they will overwrite each other, creating errors in the data being transmitted to the control location.

The downstream data on two-way trunk 108 is passed to multiplexer/demultiplexer 133 in hub office 109. Multiplexer/demultiplexer 133 distributes the data to its various output ports and, specifically, applies the data on the downstream path of branch BR4 to the output port which is connected to multipoint junction unit 134. Multipoint junction unit 134, in turn, splits the data into downstream paths of two branches, the two paths extending to input ports of multiplexer/demultiplexer 135. Multiplexer/demultiplexer 135 inserts the data into two time slots on two-way trunk 110. This data is then passed downstream to local office 111 and, more specifically, to multiplexer/demultiplexer 136. Since the data is in two separate time slots, multiplexer/demultiplexer 136 applies the data to two separate output ports, which ports extend to office channel units 138 and 137. Each office channel unit, in turn, converts the data bytes to appropriate line signals for transmission to stations 112 and 113, respectively.

Line signals traveling upstream from station 112 or 113 are transmitted to the connected one of office channel units 138 and 137, respectively. The line signals are converted to data bits, assembled into data bytes and applied to the connected one of the input ports of multiplexer/demultiplexer 136. Multiplexer/-demultiplexer 136 inserts the data bytes from the office channel units into the appropriate time slots on two-way trunk 110. The bytes pass upstream on trunk 110 to multiplexer/demultiplexer 135, which distributes the data bytes in each time slot to a corresponding one of its output ports. The output ports are connected to upstream paths of the two branches of multipoint junction unit 134 and multipoint junction unit 134, in turn, combines the data on the two upstream branches and applies this data to an input port of multiplexer/demultiplexer 133. The upstream data bytes are therefore inserted in a time slot on two-way trunk 108 and passed upstream to multiplexer/demultiplexer 132, which distributes the data byte to an output port which is connected to the upstream path in branch BR4 of multipoint junction unit 129. Multipoint junction unit 129 combines the data bytes in the upstream paths of the several branches, as previously described, and sends the data via connector 151 to the control location.

The multiplexed downstream data from branches BR2 and BR3 on two-way trunk 114 is passed to multiplexer/demultiplexer 142 in local office 115. Multiplexer/demultiplexer 142 applies the data bytes in the two separate time slots on trunk 114 to two separate output ports, which ports extend to office channel units 144 and 143, respectively. Each channel unit, in turn, converts the data bytes to appropriate line signals for transmission to stations 116 and 117, respectively.

Line signals traveling upstream from station 116 or station 117 are transmitted to the connected one of office channel units 144 and 143, respectively. The line signals are converted to data bits, assembled into data bytes and applied to input ports of multiplexer/demultiplexer 142. The multiplexer/demultiplexer inserts the data bytes into appropriate time slots on two-way trunk 114. The bytes pass upstream on trunk 114 to multiplexer/demultiplexer 140, which distributes the data bytes in each time slot to a corresponding one of its output ports. These output ports, as previously described, are connected to upstream paths of branches BR2 and BR3. The data bytes are thus combined by multipoint junction unit 129 and sent on to the control location.

In large networks of the type shown in FIG. 1, it is customary to provide supervisory or control signals within the network for various "housekeeping" functions. These functions include, for example, monitoring the conditions of the various lines, loops and trunks and testing and maintaining the various circuits and components within the network. A set arranged to provide for testing the various circuits and components in the network is shown in hub office 101 and is identified as signaling unit 150. Typical equipment for signaling unit 150 includes keyboard controlled code generators for sending appropriate bytes which are transmitted downstream to select lines and branches extending to the components to be tested and further includes recording and display circuits for receiving, recording and displaying byte responses returned upstream by the selected lines and branches and by the components under test. Certain of these bytes are designated control bytes and differ from data and address bytes insofar as a "0" bit is written into the eighth bit position. It is to be noted that during normal modes (other than test modes when signaling unit 150 is testing components), control bytes may be transmitted upstream by various branches and units to identify conditions thereat, such as idle and out-of-service conditions.

In the normal mode, the multipoint junction unit is arranged to be transparent to all data (and address) bytes, going upstream or downstream, as previously discussed, with the exception that two bytes simultaneously going upstream on two separate branches will create errors. In addition, in the normal mode, a control byte traveling upstream is converted by the multipoint junction unit to a data byte having all "1's". Finally, in the normal mode, the multipoint junction unit is transparent to control code bytes going downstream.

In accordance with this invention, the multipoint junction unit is arranged to go into the test mode in response to a predetermined sequence of control bytes coming downstream from signaling unit 150. In this test mode, the multipoint junction unit initially blocks all of the downstream paths of the branches extending therefrom and thereafter unblocks one branch selected by a control code byte transmitted downstream from signaling unit 150. This selected branch is rendered transparent to all data and control bytes, going both upstream and downstream, between signaling unit 150 and the component under test. While this testing is proceeding, all transmission to and from the unselected branches is blocked. At the termination of the testing, a control code byte from signaling unit 150 restores the multipoint junction unit to its normal mode.

In accordance with a preferred arrangement, signaling unit 150, each multipoint junction unit, such as multipoint junction unit 129, and remote components have the capability of intercommunicating with at least nine different bytes, which are referred to as test bytes. These test bytes are summarized as follows:

| Byte Identification | Function |
|---|---|
| Test Alert (TA) | Control byte which initiates any test sequence |
| MJU Alert (MA) | Advises multipoint junction unit that testing is to proceed by way of the unit |
| Branch 1 (BR1) | Branch BR1 selection code |
| Branch 2 (BR2) | Branch BR2 selection code |
| Branch 3 (BR3) | Branch BR3 selection code |
| Branch 4 (BR4) | Branch BR4 selection code |
| All O's | Control byte that indicates end of selection sequence |
| Idle | Control byte which indicates end of testing sequence and otherwise identifies idle branch |
| Hub Identification (HID) | Identification of the hub; normally transmitted by the multipoint junction unit only |

Prior to the initiation of a testing sequence, connector 151 is manually operated to switch the two-way connection of multipoint junction unit 129 from multiplexer/demultiplexer 128 to signaling unit 150. An attendant at signaling unit 150 initiates the testing sequence by operating the keyboard to enable the code generators to send the TA control byte. Multipoint junction unit 129, in response thereto, goes to a preliminary test mode and blocks all the branches. In addition, the multipoint junction unit returns the TA control byte back to signaling unit 150, advising it that the multipoint junction unit has gone to this test mode. The signaling unit continues in sequencing and sends the MA byte. Multipoint junction unit 129, in response thereto, returns the HID byte to signaling unit 150 for display thereat to identify the multipoint junction unit (and the corresponding hub office) in the test mode. It is to be noted that the multipoint junction unit will return to its normal mode if it does not receive the MA byte within a predetermined interval after the TA byte is received. This safeguard protects against improper recognition of the TA byte and the safeguard is further useful in downstream junction units, on branches of unit 129, in the event that the TA byte should be repeated to the branch before it is blocked.

The branch selection byte or bytes of the branch or branches extending to the components, units or circuits to be tested is now transmitted by signaling unit 150 and multipoint junction unit 129 prepares to unblock this branch (or branches). At the same time, the multipoint junction unit returns the branch selection code byte to signaling unit 150 for display thereat to identify the branch to be selected. Signaling unit 150 now sends the All 0's control byte and, at multipoint junction unit 129, the selected branch is unblocked, rendering it transparent to data and control codes in both directions and the junction unit is rendered unresponsive to any subsequent selection codes. All other branches remain blocked; no data can be transmitted either downstream or upstream through these blocked branches. Signaling unit 150 may now control testing of units connected to or downstream from the selected branch. At the termination of the testing, signaling unit 150 sends the Idle control byte to return multipoint junction unit 129 to the normal mode.

In the event that it is desired to test units or components in hub office 109 or in a local office further downstream, such as local office 111, signaling unit 150 sends the branch selection byte BR4 and the All "0's" byte after sending the TA and MA codes. This selects and unblocks branch BR4, whereby signaling unit 150 can intercommunicate with multipoint junction unit 134 by way of branch BR4, multiplexer/demultiplexer 132, trunk 108 and multiplexer/demultiplexer 133. Signaling unit 150 again sends the TA control byte placing multipoint junction unit 134 in the test mode. Multipoint junction unit 134 returns the TA code byte, signaling unit 150 sends the MA byte and multipoint junction unit 134 returns the HID byte. Signaling unit 150 now sends the appropriate branch selection byte to initiate the unblocking of the branch of multipoint junction unit 134 extending to the component to be tested. The branch selection code byte is returned by multipoint junction unit 134 and signaling unit 150 sends the All O's control byte to complete the selection. The testing of the equipment connected to the selected branch of multipoint junction unit 134 now proceeds in the same manner as the testing of equipment connected to multipoint junction unit 129. At the termination of the testing, signaling unit 150 sends the Idle control code byte, returning all intervening multipoint junction units, such as multipoint junction unit 129 and multipoint junction unit 134, to their normal conditions.

It is to be noted that in the interchange of data bytes in a central office of the type disclosed in the above-identified copending application of M. P. Cichetti, Jr. et al., various units repeat each byte five times (for example) to provide various advantages of flexibility, as disclosed in said copending application. Signaling unit 150 is, therefore, correspondingly arranged to repeat each byte five times (for example), utilizing substantially identical circuitry as the type disclosed in the copending application. Each multipoint junction unit, therefore, receives each control byte a corresponding plurality of times and, in general, provides the above-described functions in response to the first byte of the plurality that is received and detected. With respect to the function of returning control bytes, the multipoint junction unit responds not only to the first byte received but responds to each subsequent byte, whereby each test byte returned by the multipoint junction unit is transmitted five times (for example) to render the signaling of the unit compatible with the signaling format of the office circuitry disclosed in the copending application of M. P. Cichetti, Jr., et al.

Figure 2A:
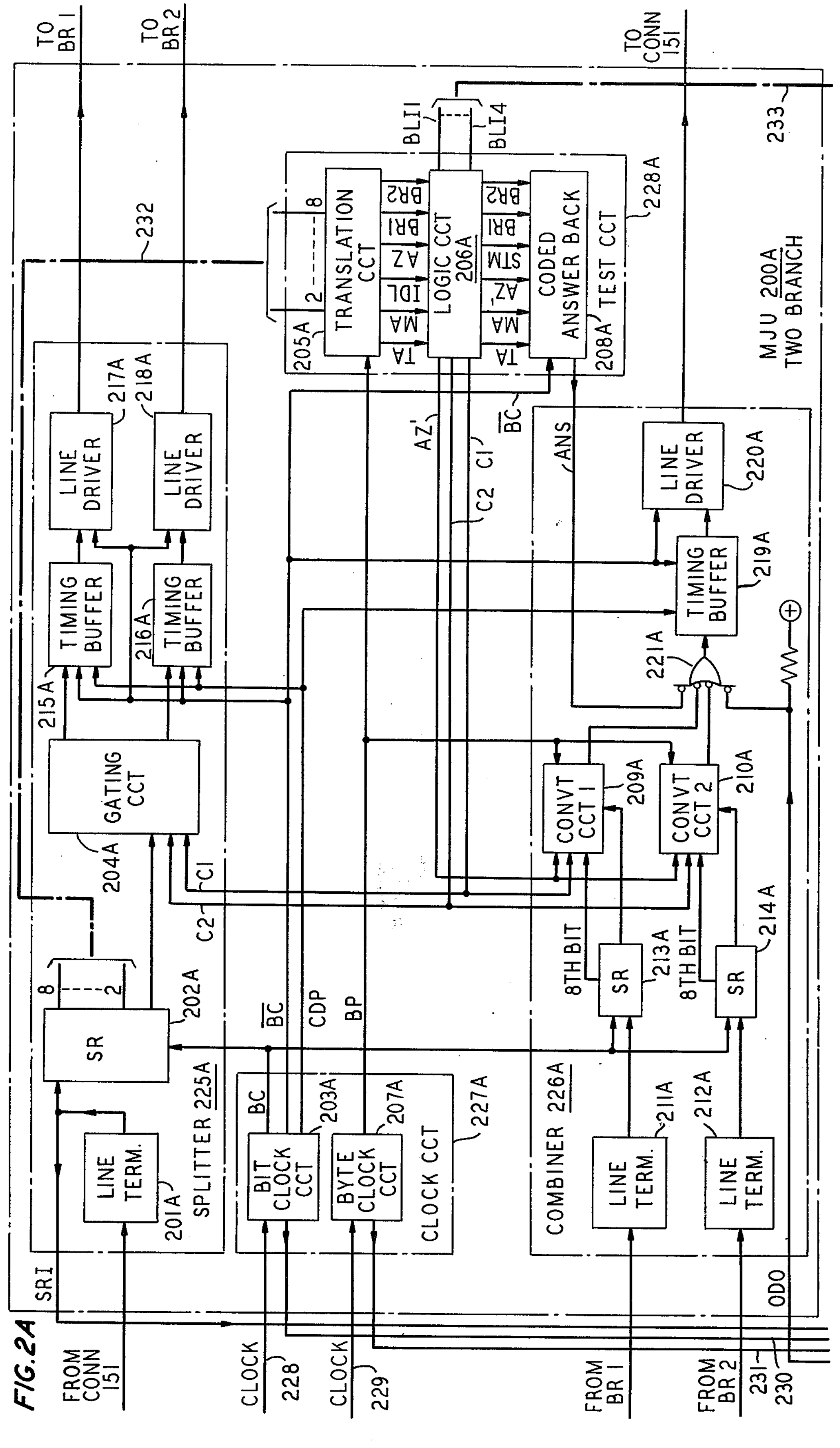
FIGS. 2A and 2B, when aligned vertically show, in schematic form, the details of a four-branch hub or junction unit.
Figure 2B:
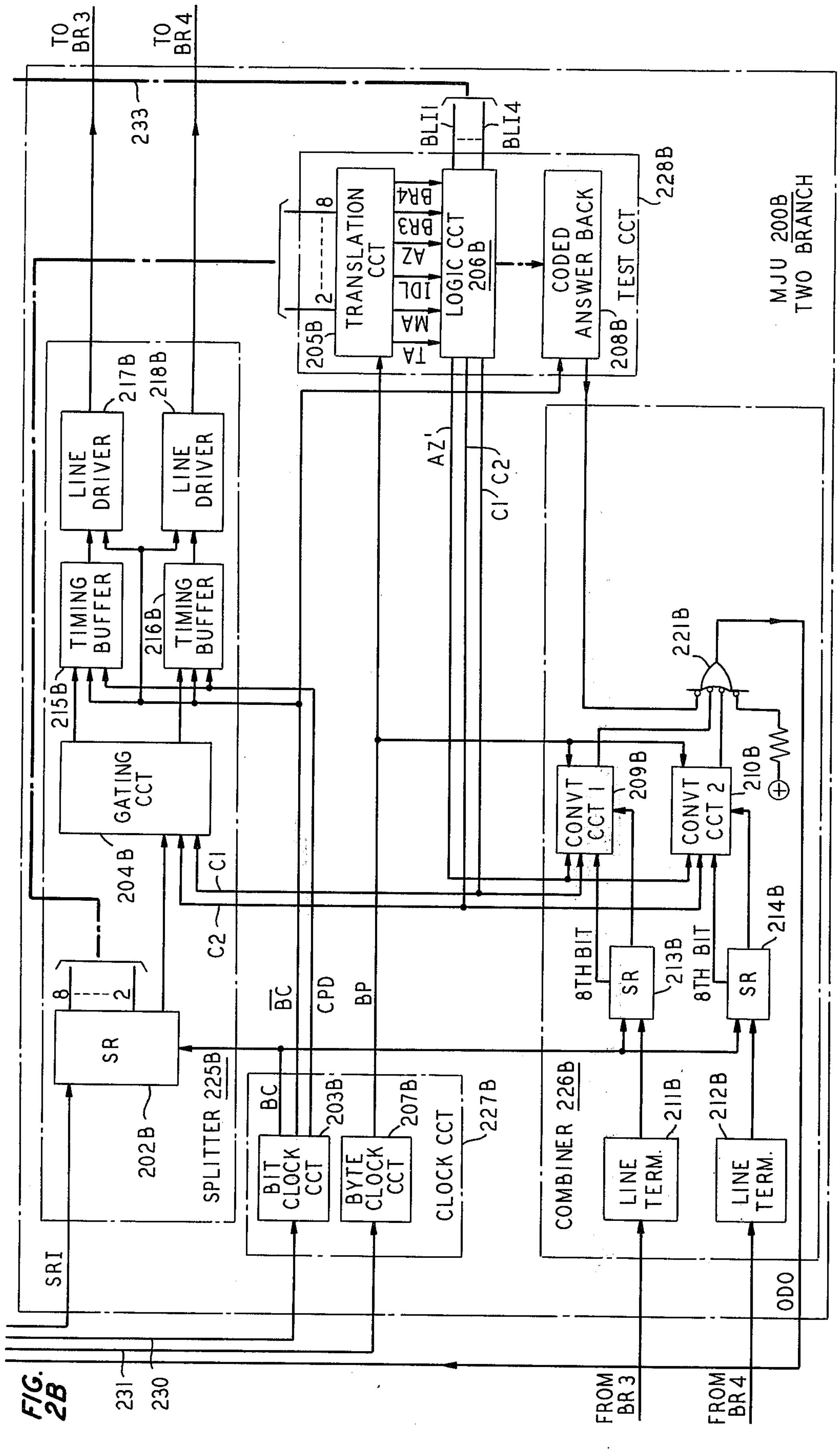

FIGS. 2A and 2B disclose a four-branch multipoint junction unit, such as multipoint junction unit 129. The four-branch multipoint junction unit consists of two two-branch junction circuits, identified as two-branch unit 200A, shown in FIG. 2A, and two-branch unit 200B, shown in FIG. 2B. It is to be understood that a two-branch multipoint junction unit, such as unit 134, comprises one two-branch unit, such as unit 200A.

Each of the two-branch units is arranged in substantially the same manner, with minor exceptions which are pointed out hereinafter. In general, a two-branch multipoint junction unit consists of four major circuits identified in FIG. 2A as splitter 225A, combiner 226A, clock circuit 227A and test circuit 228A. The corresponding circuits in two-branch unit 200B are correspondingly identified as splitter 225B, combiner 226B, clock circuit 227B and test circuit 228B.

Figure 4:
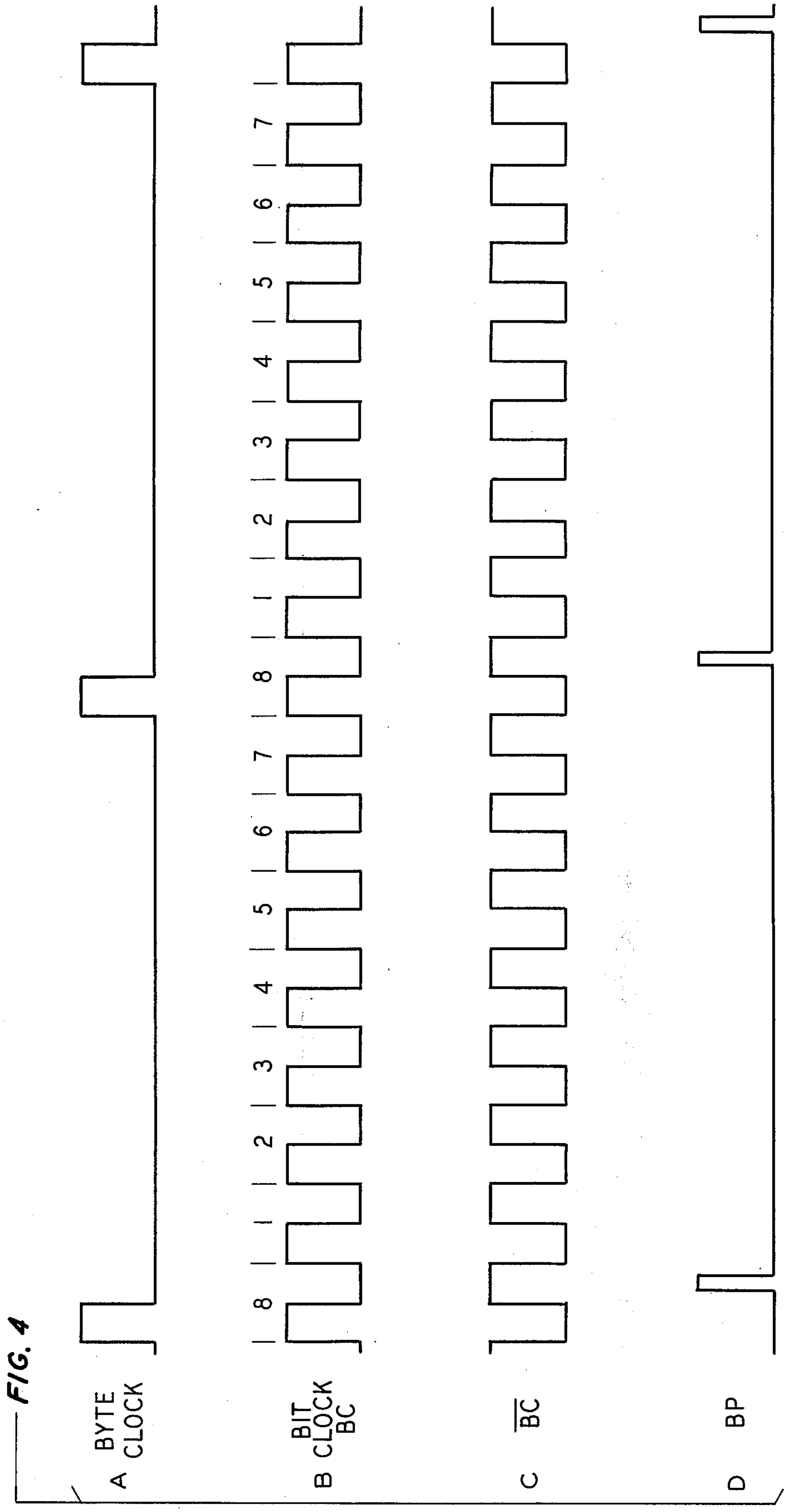
FIG. 4 depicts timing waves representing outputs of various circuits in the junction unit.

Input signals to two-branch unit 200A are provided by the upstream paths of branch BR1 and branch BR2, the downstream path from connector 151 and incoming clock leads 228 and 229. Clock leads 228 and 229 extend to the office reference clock (not shown), deriving therefrom the bit clock and byte clock pulses, which are shown as timing waves A and B, respectively, in FIGS. 4A and 4B of the copending application of M. P. Cichetti, Jr. et al. and similarly shown as timing waves A and B in FIG. 4 of this application. These clock pulses are applied to clock circuit 227A and, more specifically, the bit clock pulse on clock lead 228 is applied to bit clock circuit 203A and the byte clock pulse on clock lead 229 is applied to byte clock circuit 207A.

Broadly, it is the function of clock circuit 227A to develop appropriate timing pulses for the functioning of the multipoint junction unit in two-branch unit 200A. In addition, bit clock circuit 203A and byte clock circuit 207A repeat the bit and byte clock pulses on leads 228 and 229 and apply them to leads 230 and 231, respectively, for application to clock circuit 227B in two-branch unit 200B. Bit clock circuit 203A also repeats the bit clock pulse and applies it to lead BC. In addition, bit clock circuit 203A inverts the bit clock pulse and applies the inverted pulse, shown as timing wave C of FIG. 4, to lead BC. Finally, bit clock circuit 203A normally provides a high potential to lead CDP, lowering the potential in the event the office reference clock fails and the incoming bit clock pulses do not appear on lead 228 for a predetermined interval of time. Byte clock circuit 207A responds to the byte clock pulse by producing a narrow pulse following the trailing edge of the byte clock pulse, as shown in timing wave D of FIG. 4, which pulse is applied to lead BP.

The downstream data from control location 104 and passed by way of connector 151 to the multipoint junction unit, is applied to splitter 225A. The general function of the splitter, such as splitter 225A, is to repeat the incoming downstream bytes and apply them to the downstream paths of branches BR1 and BR2. In addition, when a branch is blocked, the splitter applies the All 0's control byte to the branch.

The data on the upstream paths from branches BR1 and BR2 are applied to combiner 226A, it being recalled that data is normally received from one upstream branch, the incoming signals on the other branch normally being an all "1's" data byte (line idle) or a control byte (such as the Idle control byte). The principal function of the combiner during the normal mode of the multipoint junction unit is to repeat the incoming data bytes from the active upstream branch and to apply the repeated bytes to the upstream path through connector 151 to the control location. In addition, combiner 226A detects the eighth bit of each incoming upstream byte, determines if the byte is a control byte (eighth bit is a "0"), and converts the byte to an all "1's" data byte; the multipoint junction unit thereby blocking upstream control bytes, when in the normal mode, and permitting another branch to send upstream.

When the multipoint junction unit is in the test mode, combiner 226A blocks all upstream bytes from a blocked branch and converts each byte from the blocked branch into an all "1's" data byte. The combiner repeats, without any conversion, all upstream bytes from a selected branch, making the multipoint junction unit fully transparent to the upstream bytes on the selected branch.

Inputting to test circuit 228A consists of data, address and control bytes derived from splitter 225A over cable 232 and timing signals on leads BP and BC. In general, test circuit 228A decodes the incoming bytes, determines when a test mode is to be initiated, generates the various "answerback" bytes, selects the branch to be unblocked, and sets the multipoint junction unit in the test mode state.

The answerback bytes generated by test circuit 228A are applied to output lead ANS and passed to combiner 226A to be repeated to the upstream path back to the control location. Signals from test circuit 228A, which defines the selected one and blocked one of branches BR1 or BR2, are passed by way of output leads C1 and C2 to combiner 226A and to splitter 225A. The indication defining the final test mode condition is passed by way of lead AZ' to combiner 226A. Finally, various signals, described in detail hereinafter, defining appropriate interrelationships of test circuit 228A in unit 200A and test circuit 228B in unit 200B, are exchanged by way of leads BLI1 through BLI4 and cable 233.

The circuit components for splitter 225A in two-branch unit 200A comprise line terminator 201A, shift register 202A, gating circuit 204A, timing buffers 215A and 216A, and line drivers 217A and 218A. Splitter 225B in two-branch unit 200B is arranged and operates in substantially the same manner as splitter 225A with the exception that it does not include a line terminator corresponding to line terminator 201A.

Downstream data bytes from connector 151 which are received by splitter 225A are applied to line terminator 201A. Line terminator 201A converts these incoming line signals to data bits and serially applies them to shift register 202A and to shift register 202B in splitter 225B by way of lead SRI.

Shift register 202A (and similarly shift register 202B) has a plurality of stages sufficient in number to store the eight bits of a data byte. The serial bits of each byte from line terminator 201A are shifted in and through the stages of shift register 202A by the bit clock pulses on lead BC. The data bits in each byte stored in the several stages of shift register 202A are read out in parallel through cable 232 to test circuit 228A. The data shifted into the final stage of shift register 202A is serially read out and applied to gating circuit 204A.

When the multipoint junction unit is in the normal mode, enabling potentials are applied to gating circuit 204A by leads C1 and C2 and gating circuit 204A splits the serial bit stream applied thereto by shift register 202A by passing the stream to both of timing buffers 215A and 216A. In the test mode, test circuit 228A applies a disabling potential to either or both of leads C1 and C2. If test circuit 228A applies a disabling potential to lead C1, gating circuit 204A blocks the serial stream and applies "0" bits to timing buffer 215A, thereby forming an All "0's" control byte. Alternatively, if test circuit 228A applies a disabling potential to lead C2, gating circuit 204A applies All "0's" control bytes to timing buffer 216A. Of course, if test circuit 228A applies a disabling potential to both leads C1 and C2, gating circuit 204A applies all "0's" control bytes to both timing buffers.

Timing buffers 215A and 216A are arranged in substantially the same manner and normally function to retime and re-align the serial bit stream under control of the bit clock pulses on lead BC. More specifically, the timing buffer provides a delay which, when added to the delay of shift register 202A, re-establishes the correct phase for each data byte. Timing buffers 215A and 216A are also arranged to block the serial bit stream applied thereto when a disabling potential is applied to lead CDP indicating that clock pulses are not being received by bit clock circuit 203.

The output bit stream of timing buffers 215A and 216A are passed to line drivers 217A and 218A, respectively. Each line driver retimes each bit under control of the clock pulses on the lead BC and repeats the bits to the downstream path of an outgoing branch. As seen in FIG. 2A, line driver 217A applies the bit stream to outgoing branch BR1 and line driver 218A applies the outgoing bit stream to outgoing branch BR2.

As noted above, splitter 225B is arranged and operates in substantially the same manner as splitter 225A. The outgoing bit streams of splitter 225B are, of course, applied to downstream paths of branches BR3 and BR4.

The circuit components of combiner 226A comprise line terminators 211A and 212A, shift registers 213A and 214A, converters 209A and 210A, signal AND gate 221A, timing buffer 219A, and line driver 220A. Combiner 226B is arranged and operates in substantially the same manner as combiner 226A with the exception that it does not include a timing buffer and line driver.

Incoming upstream signals from branch BR1 are received by combiner 226A and applied to line terminator 211A. Similarly, incoming upstream signals from branch BR2 are applied to line terminator 212A. Each of line terminators 211A and 212A repeats the serial data bits of the data bytes to shift registers 213A and 214A.

Each of shift registers 213A and 214A includes a plurality of stages sufficient in number to store the data bits of a data byte. The incoming data bit stream is shifted in and through the several stages of shift register 213A (and, similarly, shift register 214A) in response to shift pulses derived from lead BC. The serial outputs of the last stages of shift registers 213A and 214A are passed to converter circuits 209A and 210A, respectively. At the same time, the condition of the first stage and, therefore, the eighth bit of the data byte, is passed from each of shift registers 213A and 214A to converter circuits 209A and 210A.

When the multipoint junction unit is in the normal mode (enabling potentials on leads C1 and C2 and no energizing potential on lead AZ′), it is the function of each converter circuit to repeat and passs on each data (or address) byte and to convert each control byte to an all "1's" data byte. More specifically, considering converter circuit 209A, if the bit in stage one of shift register 213A is a "0" when the byte timing pulse on lead BP is applied to converter circuit 209A, it is indicated that the eighth bit is a "0" bit, the byte is a control byte and converter circuit 209A converts all the bits of the byte being serially shifted out of shift register 213A to "1" bits. If, however, the eighth bit is a "1" bit, the output of shift register 213A is repeated by converter circuit 209A without conversion. Advantageously, the function of converting the byte to "1" bits or repeating the byte is provided by gating circuitry such as NAND gate. The output bits of converter circuit 209A are then passed to signal AND gate 221A.

When the multipoint junction unit is in the test mode, lead AZ′ has an energizing potential applied thereto and either or both of leads C1 and C2 have disabling potentials applied thereto. Assuming that branch BR1 is blocked, lead C1 has a disabling potential applied thereto (and lead AZ′ has an energizing potential thereon). Converter circuit 209A thereupon blocks the output of shift register 213A, applying an all "1's" data byte to a signal AND gate 221A. In the event that branch BR1 is the selected branch, lead AZ′ has an energizing potential applied thereto while lead C1 has an enabling potential thereon, and converter circuit 209A repeats the output bit stream of shift register 213A without regard to the condition of the eighth bit of each data byte, making the combiner transparent to both data and control bytes.

Converter circuit 210A operates in substantially the same manner as converter circuit 209A with the exception that it responds to the signaling potentials on lead C2. The output of converter 210A is also passed to an input of signal AND gate 221A. Other inputs to signal AND gate 221A comprise the answerback data bytes generated by test circuit 228A and applied to lead ANS and the output bit stream of combiner 226B applied to lead ODO. As pointed out hereinafter, only one of the inputs to AND gate 221A can be providing data or control bytes other than the all "1's" data byte, all other inputs being blocked. The incoming bit stream on this unblocked input is passed through AND gate 221A to timing buffer 219A which delays and retimes the signal under control of the clock pulses on lead BC or blocks the signal in response to a disabling potential on lead CDP. The output of timing buffer 219A is passed to line driver 220A. Line driver 220A is controlled by clock signals on lead BC and repeats the bits for application to the upstream channel extending to connector 151.

As previously noted, combiner circuit 226B is arranged and operates in substantially the same manner as combiner circuit 226A, with the exception that it does not include a timing buffer, such as timing buffer 219A and a line driver, such as line driver 220A. The output of the signal AND gate identified as gate 221B is applied directly to output lead ODO which, as previously described, is passed to an input of signal AND gate 221A.

The principal components of test circuit 228A comprise translation circuit 205A, logic circuit 206A and coded answerback circuit 208A. The bits of the incoming bytes applied to splitter 225A and passed, in parallel, through cable 232 to test circuit 228A, as previously described, are applied to translation circuit 205A. It is noted that these bits constitute bits 2 through 8, the first bit not being significant to identify the byte. Translation circuit 205A provides conventional translation functions when operated by the pulse on lead BP which, as previously described, is derived from the byte clock pulse. The translation functions comprise recognition of various bytes and, in response thereto, momentary energization of corresponding ones of output leads.

The codes recognized by translation circuit 205A and the output leads thereby energized are summarized below:

| Byte Identification | Output Lead Energized |
|---|---|
| Test Alert (TA) | TA |
| MJU Alert (MA) | MA |
| Idle | IDL |
| All O's | AZ |
| Branch 1 (BR1) | BR1 |
| Branch 2 (BR2) | BR2 |

The several output leads of translation circuit 205A extend to inputs of logic circuit 206A. In general, logic circuit 206A is controlled by the energization of the various output leads of translation circuit 205A to place the two-branch multipoint junction unit in its various operating modes; to provide enabling of coded answerback circuit 208A to return the several answerback bytes; and to intercommunicate with test circuit 228B in two-branch unit 200B, for purposes described hereinafter.

Coded answerback circuit 208A is arranged to generate answerback bytes, as determined by the energization of leads from logic circuit 206A, and to serially apply the bits of the bytes to lead ANS under control of the pulses on lead BC. More specifically, coded answerback circuit 208A is enabled to generate an answerback byte so long as an enabling potential is on output lead STM of logic circuit 206A and a disabling potential is on lead AZ', the particular byte generated being determined by leads TA, MA, BR1 and BR2, as further described hereinafter.

Test circuit 228B in two-branch multipoint junction unit 200B is arranged in substantially the same manner as test circuit 228A, with the exception that the translation circuit 205B therein is arranged to recognize the branch BR3 and branch BR4 selection codes and coded answerback circuit 208B is limited to the generation of the branch BR3 and branch BR4 selection codes.

Assume now that a test sequence is initiated by the remote signaling unit 150. This first byte of the sequence is the TA control byte. As previously described, the control byte is received by splitter 225A and the bits of the byte are passed by way of cable 232 to translation circuit 205A. Translation circuit 205A, upon the application of the timing pulse on lead BP, momentarily engagizes output lead TA. Logic circuit 206A, in response thereto, energizes lead STM, momentarily energizes lead TA, and applies disabling potentials to leads C1 and C2. The application of the disabling potentials to leads C1 and C2 blocks branches BR1 and BR2, as previously described. The energization of lead STM enables coded answerback circuit 208A and, in response to the momentary energization of lead TA, coded answerback circuit 208A generates the sequence of bits corresponding to the TA control byte and serially applies these bits to output lead ANS for application back upstream. At the same time, the TA control byte is received by splitter 225B and recognized by translation circuit 205B and logic circuit 206B, in response to this recognition, applies disabling potentials to output leads C1 and C2 to block branches BR3 and BR4.

The next code byte in the test sequence from signaling unit 150 is the MJU Alert (MA) byte. Translation circuit 205A, in response to this byte, momentarily energizes lead MA and logic circuit 206A responds thereto by momentarily energizing its output lead MA. Logic circuit 206A maintains energized output lead STM and maintains the disabling potentials on leads C1 and C2. Branches BR1 and BR2 remain blocked and coded answerback circuit 208A is enabled to generate a hub identification (HID) control byte, serially applying the bits of the byte to lead ANS for transmission back to signaling unit 150. Test circuit 228B provides no function at this time with the exception that disabling potentials are maintained on output leads C1 and C2, keeping branches BR3 and BR4 blocked.

After signaling unit 150 receives the hub identification byte, the branch selection code byte is transmitted to select the appropriate branch. Assuming the branch BR1 selection code byte is transmitted, translation circuit 205A momentarily energizes output lead BR1. Logic circuit 206A, in response thereto, stores the indication that the branch BR1 byte has been received and momentarily energizes its output lead BR1. Lead STM is maintained energized and coded answerback circuit 208A generates and returns to signaling unit 150 and branch BR1 selection code byte via lead ANS. Similarly, if a selection code for another branch is transmitted at that time, the appropriate logic circuit (logic circuit 206A or logic circuit 206B) stores the indication thereof and operates the associated coded answerback circuit to return the corresponding selection code to signaling unit 150. In addition, the logic circuit storing the indication applies appropriate potentials to a selected one of leads BLI1 through BLI4 to advise the other logic circuit that a branch selection code has been received and the indication thereof has been stored. More specifically, upon the reception of the branch BR1 selection code, logic circuit 206A energizes lead BLI1 and logic circuit 206B is therefore advised of the storage of the branch selection code by logic circuit 206A. Similarly, other storage indications are interchanged by the logic circuits so that each logic circuit is advised when the other logic circuit has stored an indication that a branch selection code byte has been received.

As will be described hereinafter, one code or several codes in sequence can be received and stored by the logic circuits which, in turn, operate the associated coded answerback circuit to send the corresponding byte back to signaling unit 150.

After the branch selection code or codes have been transmitted and the answerbacks received, signaling unit 150 sends the All 0's byte. Translation circuit 205A (and translation circuit 205B) momentarily energizes output lead AZ. Logic circuits 206A and 206B are presently "primed" to recognize the momentary energization of input lead AZ by the prior storage of the indication of the reception of a branch selection code, it being noted that both logic circuits are so "primed" as a result of the intercommunication by way of leads BLI1 through BLI4. Primed logic circuit 206A (and logic circuit 206B) therefore energizes output lead AZ' and at the same time provides an enabling potential or enabling potentials to appropriate ones of output leads C1 and C2, in accordance with the previously received branch selection codes. This, as previously described, unblocks the branches to be selected and eliminates the converting function of the appropriate ones of the converter circuits 209A, 209B, 210A or 210B, whereby the selected branches are enabled to transmit upstream both data and control bytes and signaling unit 150 is able to transmit downstream to the unblocked branch or branches. Logic circuit 206A also applies a disabling potential to the lead AZ' which extends to coded answerback circuit 208A and the energization of this AZ' lead disables the coded answerback circuit to preclude the generation of further answerback signals. Thus, the selected branch or branches are unblocked in both directions and signaling unit 150 can communicate therewith to test units on the branch, for example, or to selectively communicate with units on the branch or branches, or to send additional sequences to select a branch further downstream, but in series with the selected branch.

At the termination of the communication, signaling unit 150 sends the Idle control byte. The translation circuit momentarily energizes output lead IDL and logic circuit 206A, in response thereto, returns to its initial condition. The energization of output leads STM and AZ' is removed and enabling potentials are applied to output leads C1 and C2. The multipoint junction unit is now restored to its normal mode.

Figure 3:
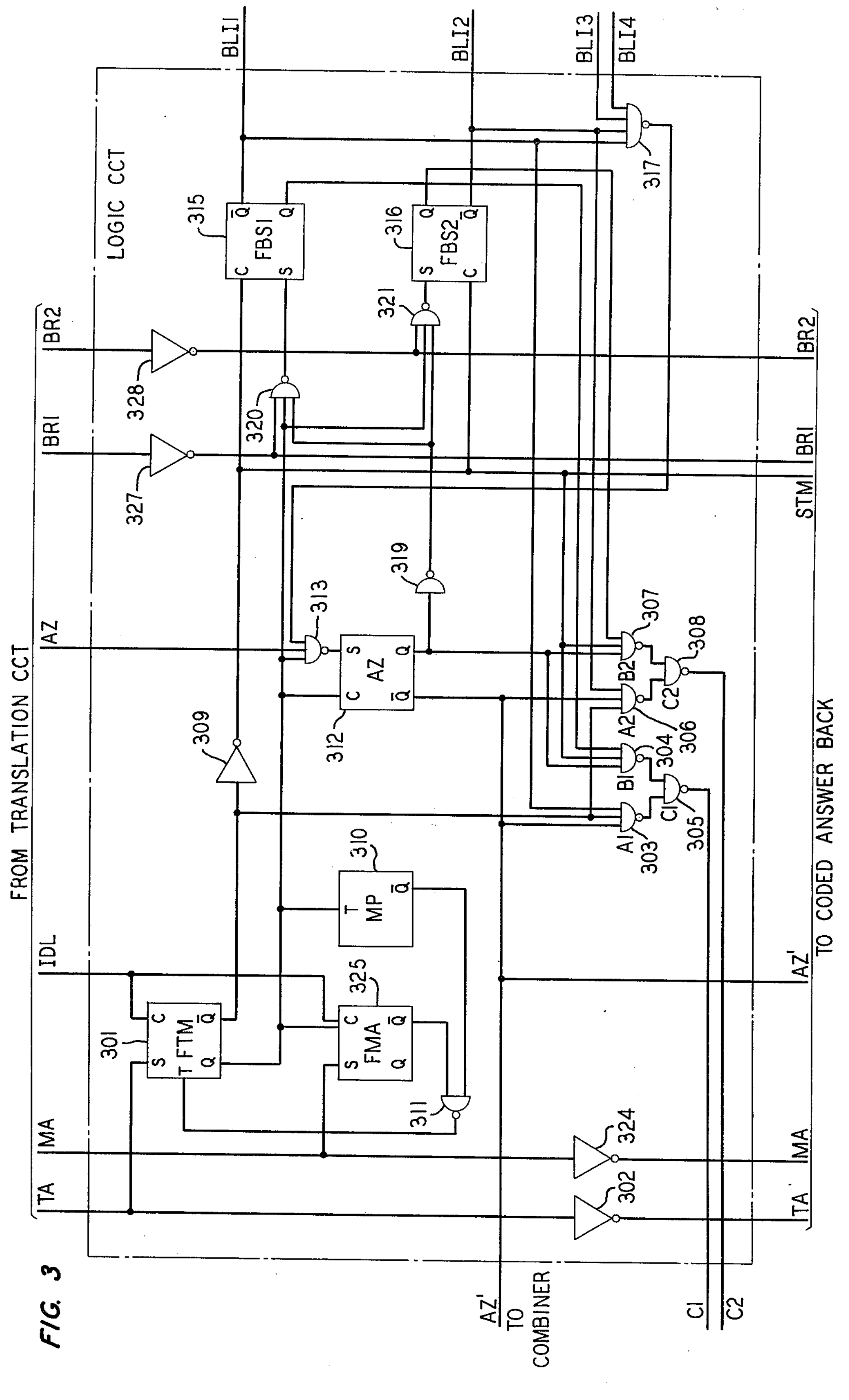
FIG. 3 shows the details of a logic circuit suitable for use in the junction unit.

Refer now to FIG. 3 showing the details of a logic circuit, such as logic circuit 206A. With the logic circuit in the normal mode, all flip-flops therein are in the CLEAR state. Gates 303 and 306 are connected to various Q outputs of the several flip-flops, as described in detail hereinafter, and, since all the flip-flops are CLEAR, the outputs of these gates are down. The output of gates 303 and 306 extend to an input of gates 305 and 308, respectively. As a consequence, the outputs of gates 305 and 308 are up, applying enabling potentials to leads C1 and C2.

When the TA code is received, the translation circuit, such as translation circuit 205A, momentarily energizes its output lead TA. Lead TA extends to the SET input of flip-flop 301 and to the input of inverter 302. The negative TA pulse sets flip-flop 301 and enables inverter 302 to momentarily energize output lead TA which extends to the coded answer back circuit. The setting of flip-flop 301 lowers the potential on output terminal Q. This is inverted by inverter 309 to apply an enabling potential to lead STM. The coded answerback circuit is enabled by energized lead STM to generate the TA byte.

With flip-flop 301 in the SET condition, the low potential on output terminal Q is applied to gates 303 and 306. The outputs of gates 303 and 306 are therefore high. At this time the outputs of gates 304 and 307 are also high, since inputs thereof extend to the terminal Q output of flip-flop 312 (and, in addition, to the terminal Q outputs of flip-flops 315 and 316). As a consequence, the outputs of gates 304 and 307 are also high. Since the inputs of gates 305 and 308 are all high, the outputs thereof are low. This applies disabling potentials to leads C1 and C2 to block the branches, as described above.

The setting of flip-flop 301 also toggles monopulser 310 and monopulser 310 proceeds to time. After a predetermined interval monopulser 310 times out and, assuming the MA byte has not been received, a pulse is passed through gate 311 to the TOGGLE input of flip-flop 301. This again clears flip-flop 301, restoring the logic circuit to its normal condition.

Under normal operating procedures the MA byte is received from signaling unit 150 before monopulser 310 times out. The translation circuit applies a negative pulse to input lead MA of the logic circuit and this negative pulse is passed to the SET input of flip-flop 325 and to inverter 325, which momentarily energizes output lead MA. Flip-flop 325 is set and disables gate 311, precluding the toggling of flip-flop 301 by the timeout of monopulser 310. Flip-flop 301 is therefore maintained in its SET condition by the timely arrival of the MA code byte, the enabling potential on lead STM is maintained and the identification byte is returned.

The branch selection code is now received and (assuming branch BR1 and BR2) a pulse is passed through the appropriate one of inverters 327 and 328 and applied to gate 320 or 321. At this time, gates 320 and 321 are enabled by high potentials derived from the output Q terminal of flip-flop 301 and output of inverter 319, which is inverting the low potential on the output Q terminal of flip-flop 312. The branch selection pulse is therefore passed through the appropriate gate (320 or 321) to set flip-flop 315 or flip-flop 316. At the same time, the branch pulse momentarily energizes output lead BR1 or output lead BR2.

Assume that the branch BR1 byte is received. Output lead BR1 is energized and the branch selection code is returned to the signaling unit. At the same time, flip-flop 315 is SET and a negative potential is provided to the output Q terminal, driving the output of gate 317 high. This, in turn, enables gate 313, "priming" the gate for the subsequent passage of the pulse on the AZ lead. In addition, the negative potential at the output Q terminal of flip-flop 315 is applied to lead BLI1 for application to the gate in the other logic circuit corresponding to gate 317, thus priming the other logic circuit in the same manner. Of course, if the branch BR2 selection code had been received, flip-flop 316 would have been SET, a negative energizing potential passed to output lead BLI2 and the output of gate 317 similarly driven high to enable gate 313.

After all branch codes are sent, the All 0's byte is transmitted. A pulse is applied by the translation circuit to lead AZ and passed through enabled gate 313 to set flip-flop 312. The setting of flip-flop 312 drives its output Q terminal low and this low potential is passed to output lead AZ′ extending to the combiner and to correspondingly identified output lead AZ′, extending to the coded answerback circuit. The converter circuit or circuits in the combiner associated with the selected branch or branches now cease to convert control bytes to an all "1's" byte and the answerback circuit is precluded from generating answerback bytes.

Flip-flop 312 also applies a high potential to output terminal Q, which potential is inverted by inverter 319 to disable gates 320 and 321. Therefore, the logic circuit will no longer recognize additional selection codes. The high potential on the Q output of flip-flop 312 is also passed to gates 304 and 307. Since flip-flop 315 is SET by the branch BR1 selection code, all inputs to gate 304 are high and its output is low. The output of gate 305 is therefore high, applying an enabling potential to lead C1 to unblock branch BR1.

If branch selection code BR2 is received, flip-flop 316 is SET. When flip-flop 312 is SET, all inputs to gate 307 are high and the output of gate 307 therefore goes low, driving the output of gate 308 high. This applies an enabling potential to output lead C2 to unblock branch BR2. The branch unit is now in the test mode state and intercommunication between signaling unit 150 and the selected branch or branches now proceeds.

At the termination of the intercommunication, signaling unit 150 sends the Idle byte. The translation circuit pulses lead IDL and this clears flip-flops 301 and 325. Flip-flop 301, in turn, clears flip-flops 315 and 316 via inverter 309 and, in addition, clears flip-flop 312 directly. It also assures that flip-flop 325 is cleared. The clearing of these flip-flops restores the enabling potentials on leads C1 and C2, removes the disabling potentials on leads AZ′, removes the one or more negative signaling potentials on intercommunication leads BLI1 through BLI4, and removes the enabling potential on lead STM. This restores the logic circuit to its normal condition.

Although a specific embodiment of this invention has been shown and described, it will be understood that various modifications may be made without departing from the spirit of this invention.

We claim:

1. A junction circuit terminating a main line and a plurality of branch lines and having means for broadcasting data words and control words from the main line to all of the branch lines and means for controlling the passage of data words and control words from each of the branch lines to the main line characterized in that the passage controlling means normally enables the passage of data words and blocks the passage of control words and there is further included means responsive to branch line selection signals from the main line for changing the enabling and blocking operation of the passage controlling means of selected branch lines and differently changing the enabling and blocking operation of the passage controlling means of unselected branch lines.

2. A junction circuit in accordance with claim 1 wherein the operation changing means includes means responsive to the branch selection signals from the main line for precluding passage of data words and control words from unselected ones of the branch lines to the main line.

3. A junction circuit in accordance with claim 1 wherein the operation changing means includes means responsive to initial ones of the selection signals for precluding passage of data words and control words from all of the branch lines to the main line and means responsive to subsequent ones of the selection signals for selecting enabling passage of data words and control words from each selected branch to the main line.

4. A junction circuit in accordance with claim 3 wherein there is further included means responsive to the initial ones of the selection signals for blocking the broadcast of data words and control words from the main line to the branch lines.

5. A junction circuit in accordance with claim 4 wherein there is further included means responsive to the subsequent selection signals for permitting passage of data words and control words from the main line to the selected ones of the branch lines.

6. A junction circuit in accordance with claim 1 wherein the operations changing means includes means for permitting the passage of data words and control words from the selected ones of the branch lines.

7. A junction circuit in accordance with claim 3 wherein the precluding means includes means for sending data signals identifying the junction circuit back to the main line.

8. A junction circuit in accordance with claim 3 wherein the enabling means includes means for sending data signals identifying the selected branch back to the main line.

* * * * *